(12) United States Patent  (10) Patent No.: US 7,574,716 B2
Yang et al.  (45) Date of Patent: Aug. 11, 2009

(54) GUIDE MECHANISM AND OPTICAL DRIVE UTILIZING THE SAME

(75) Inventors: Chun-Hua Yang, Taoyuan (TW); Kuo-Tung Hsu, Taoyuan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 614 days.

(21) Appl. No.: 11/052,193

(22) Filed: Feb. 8, 2005

(65) Prior Publication Data

US 2006/0179447 A1 Aug. 10, 2006

(30) Foreign Application Priority Data

Feb. 10, 2004 (TW) .............................. 93103027 A

(51) Int. Cl.
G11B 7/00 (2006.01)

(52) U.S. Cl. ...................................... 720/677; 720/675

(58) Field of Classification Search .......... 720/675–678
See application file for complete search history.

(56) References Cited

U.S. PATENT DOCUMENTS

| | | | | |
|---|---|---|---|---|
| 2,436,406 A | * | 2/1948 | Snader | 173/19 |
| 2,575,442 A | * | 11/1951 | Cooley | 346/138 |
| 4,703,243 A | * | 10/1987 | Ettelman et al. | 318/696 |
| 4,788,677 A | * | 11/1988 | Ikedo et al. | 369/223 |
| 4,841,190 A | * | 6/1989 | Matsushita et al. | 310/257 |
| 4,984,224 A | * | 1/1991 | Tsuyuguchi et al. | 369/13.19 |
| 5,090,265 A | * | 2/1992 | Slocum | 74/89.43 |
| 5,148,341 A | * | 9/1992 | Fehrenbach et al. | 360/267.5 |
| 5,191,575 A | * | 3/1993 | Kido | 369/223 |
| 5,651,206 A | * | 7/1997 | Matarazzo | 42/70.08 |
| 5,682,282 A | * | 10/1997 | Kato | 360/266.3 |
| 5,768,248 A | * | 6/1998 | Lee | 720/675 |
| 5,798,592 A | * | 8/1998 | Peterson | 310/164 |
| 5,811,903 A | * | 9/1998 | Ueno et al. | 310/90 |
| 5,982,735 A | * | 11/1999 | Tsai | 720/675 |
| 5,995,479 A | * | 11/1999 | Takizawa et al. | 720/675 |
| 6,255,749 B1 | * | 7/2001 | Aoshima et al. | 310/49 R |
| 6,317,287 B1 | * | 11/2001 | Yano et al. | 360/260 |
| 6,414,934 B1 | * | 7/2002 | Akiba | 720/675 |
| 6,541,886 B2 | * | 4/2003 | Mayumi | 310/91 |
| 6,700,261 B2 | * | 3/2004 | Mayumi | 310/91 |
| 6,724,714 B1 | * | 4/2004 | Kato et al. | 720/672 |

(Continued)

FOREIGN PATENT DOCUMENTS

TW 570266 Y * 1/2004

*Primary Examiner*—Brian E Miller
*Assistant Examiner*—Adam B Dravininkas
(74) *Attorney, Agent, or Firm*—Birch, Stewart, Kolasch & Birch, LLP

(57) ABSTRACT

A guide mechanism and the optical drive utilizing the same. The guide mechanism includes a guiding base, a first axial fixing member, a driver, and a rotary structure. The guiding base comprises a first opening and a second opening. The first axial fixing member is disposed at a side of the guiding base. The driver, disposed at an opposite side of the guiding base, comprises an opening and a second axial fixing member. The rotary structure is fixed between the first axial fixing member and the second axial fixing member, comprising a spindle and a magnetic structure. The spindle comprises an operating region and a connecting portion having a maximum outer diameter smaller than a minimum outer diameter of the operating region. The magnetic structure is attached to the connecting portion and disposed in the opening.

20 Claims, 5 Drawing Sheets

U.S. PATENT DOCUMENTS

| | | | |
|---|---|---|---|
| 6,836,034 B2 * | 12/2004 | Hsu et al. | 310/49 R |
| 7,152,234 B2 * | 12/2006 | Kabasawa | 720/606 |
| 2004/0075354 A1 * | 4/2004 | Hsu et al. | 310/90 |
| 2005/0216928 A1 * | 9/2005 | Hara et al. | 720/677 |
| 2006/0190953 A1 * | 8/2006 | Nakashima et al. | 720/676 |

* cited by examiner

GUIDE MECHANISM AND OPTICAL DRIVE UTILIZING THE SAME

BACKGROUND OF THE INVENTION

1. Field of the Invention

The present invention relates to a guide mechanism, and in particular, to a guide mechanism that can be automatically positioned and prevent glue overflow.

2. Description of the Related Art

As shown in FIG. 1, an optical drive comprises a spindle 102, a data accessing device 104 (including optical pickup head and lens), and a guide mechanism 106. The disk is positioned on the spindle 102. The data accessing device 104 reads data from the disk. The guide mechanism 106 guides the data accessing device 104 to move in a predetermined direction for storing and retrieving data from the disk.

Furthermore, as shown in FIGS. 1 and 2, the conventional guide mechanism 106 comprises a base 108, fixing members 114 and 116, a driver 118, and a rotary structure 110. The rotary structure 110 comprises a magnetic ring 122 and a rod 120. One end of the rod 120 is disposed in the fixing member 116. The other end passes through an opening 112 of the base 108 and an opening 124 of the driver 118 and is disposed in a groove 126 of the fixing member 114. A magnetic ring 122 is glued at the surrounding of a magnetic connecting portion 128 of the rod 120, located in the opening 124, and the magnetic ring 122 is as the rotary structure 110 of the guide mechanism 106.

The magnetic ring 122 is attached to the rod 120 by glue via the magnetic connecting portion 128. The magnetic ring 122 is then positioned on the rod 120 by a positioning jig (not shown) to form the rotary structure 110.

The positioning jig is a required tool for positioning and fixing the magnetic ring 122 to the rod 120. Use of the positioning jig incurs both manufacturing and labor cost. Thus, the total production cost is increased.

Furthermore, when the tolerance of the positioning jig is not accurately calibrated or during production, the positioning jig may be gradually worn, resulting in reduced efficiency.

Moreover, during a glue dispensing process, due to operator error, residual material on the positioning jig, or jig movement immediately right after placement of the magnetic ring, glue may flow into threads of the lead screws, making the jig difficult to clean, thus lowering product quality.

SUMMARY OF THE INVENTION

Therefore, an object of the present invention is to provide a guide mechanism that eliminates the shortcomings described above and reduces production cost and time.

Another object of the present invention is to provide a guide mechanism that prevents glue overflow and provides automatic positioning.

The present invention provides a guide mechanism for guiding an object in a predetermined direction. The guide mechanism includes a guiding base, a first axial fixing member, a driver, and a rotary structure. The guiding base comprises a first opening and a second opening, facing the first opening. The first axial fixing member is disposed at a side of the guiding base, having the first opening. The driver is disposed at an opposite side of the guiding base, having the second opening. The driver comprises an opening and a second axial fixing member. The rotary structure is fixed between the first axial fixing member and the second axial fixing member, comprising a spindle and a magnetic structure. The spindle comprises an operating region and a connecting portion having a maximum outer diameter smaller than a minimum outer diameter of the operating region. The magnetic structure is attached to the connecting portion and disposed in the opening.

The guide mechanism further comprises an elastic element, disposed on either the first axial fixing member or the second axial fixing member for preventing offset of the rotary structure. The elastic element corresponds to the first opening and is disposed between the first axial fixing member and the side having the first opening of the guiding base. The elastic element is a resilient sheet, a spring, or a soft pad.

The second fixing member further comprises a ring portion and a retaining portion disposed at both ends thereof, and the retaining portion is coaxially and integrally formed with the ring portion. The ring portion is disposed in the driver for enclosing electric wires therein, and the retaining portion protrudes from the driver via the opening and faces the second opening.

The second axial fixing member further comprises at least a rib, connecting the retaining portion and the ring portion such that the retaining portion protrudes from the driver via the opening. The material of the first or second axial fixing member comprises plastic, elastic material, or metal.

In the mentioned guide mechanism, the driver is a rotational motor having a housing. The housing comprises a space containing the second axial fixing member. The housing further comprises a case and a cover forming the space within the housing. The case and the cover respectively comprise at least a hook for assembly. After assembly, the opening is defined along an inner edge of each hook.

The magnetic structure is attached to the connecting portion by glue. The magnetic structure comprises at least a magnet. The magnetic structure is annular, curved, or block-shaped. The magnetic structure has a center opening defined along an axial direction with a diameter ranged between the maximum outer diameter of the connecting portion and the minimum outer diameter of the operating region.

In the guide mechanism of the present invention, since the operating region and the connecting portion have a face formed therebeween along a radial direction, the magnetic structure is added to facilitate automatic positioning during processing. Thus, additional cost for a positioning jig and an additional positioning step can be eliminated. The present invention eliminates the cost of jigs, reduces labor cost for positioning and avoids glue overflow.

Furthermore, since the maximum outer diameter of the connecting portion is designed to be less than the minimum outer diameter of the operating region, when glue is over poured, extra glue can be prevented from overflowing to the operating region by the height difference in the radial direction.

DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 3:
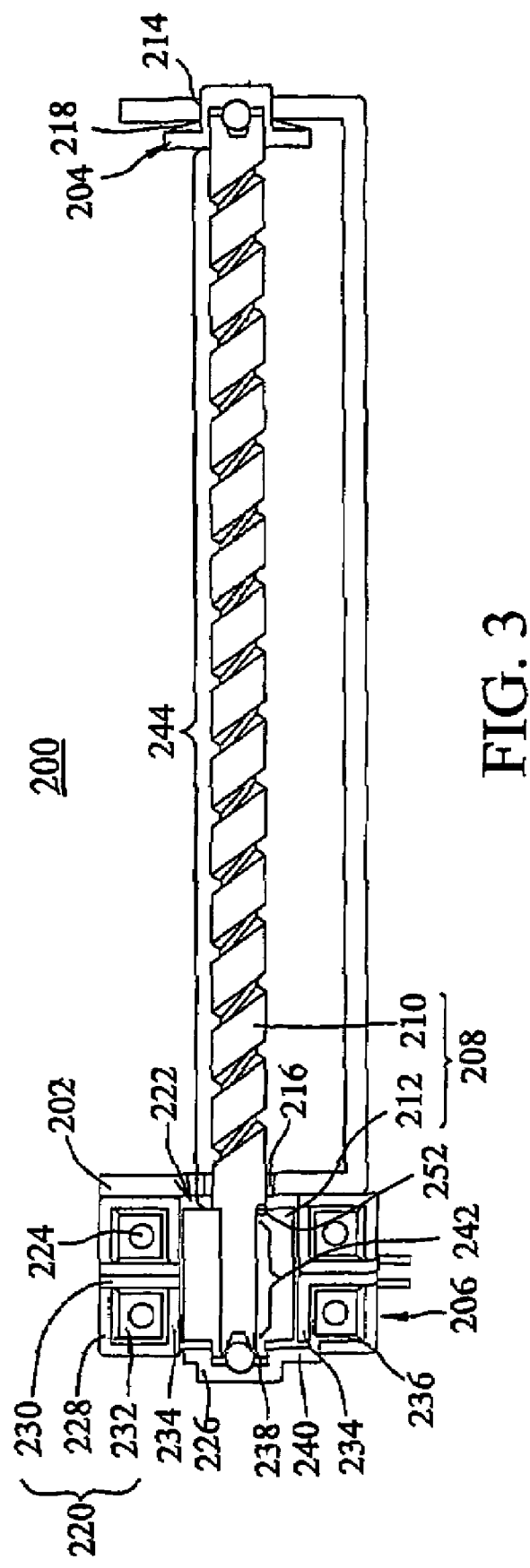
FIG. 3 is a schematic diagram of a guide mechanism of an embodiment of the present invention.
Figure 5:
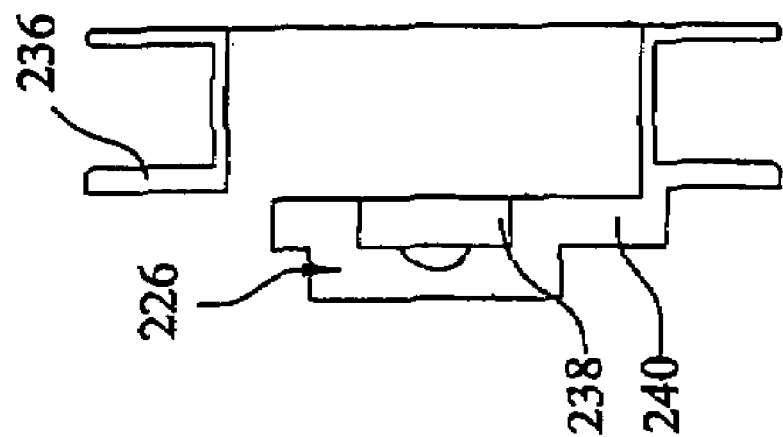
FIGS. 4-5 are front view and cross section of an axial fixing member according to the present invention.
Figure 4:
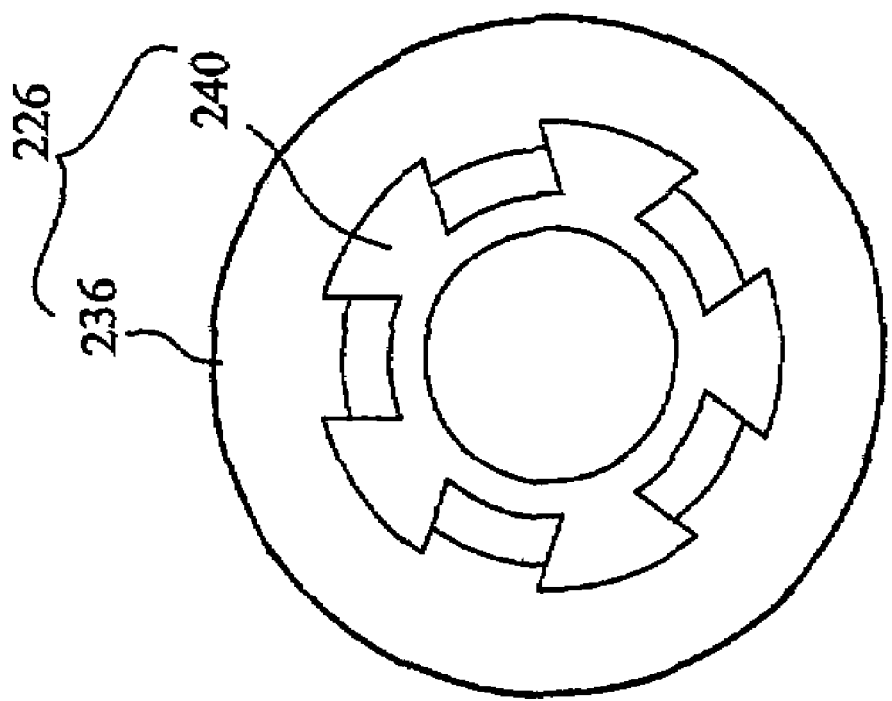

FIG. 3 is a schematic diagram of a guide mechanism 200 of an embodiment of the present invention. Please also refer to FIGS. 4 and 5. The guide mechanism 200 comprises a guiding base 202, an axial fixing member 204, an elastic element 218, a driver 206, and a rotary structure 208. The guide mechanism 200 guides an object in a predetermined direction.

Figure 1:
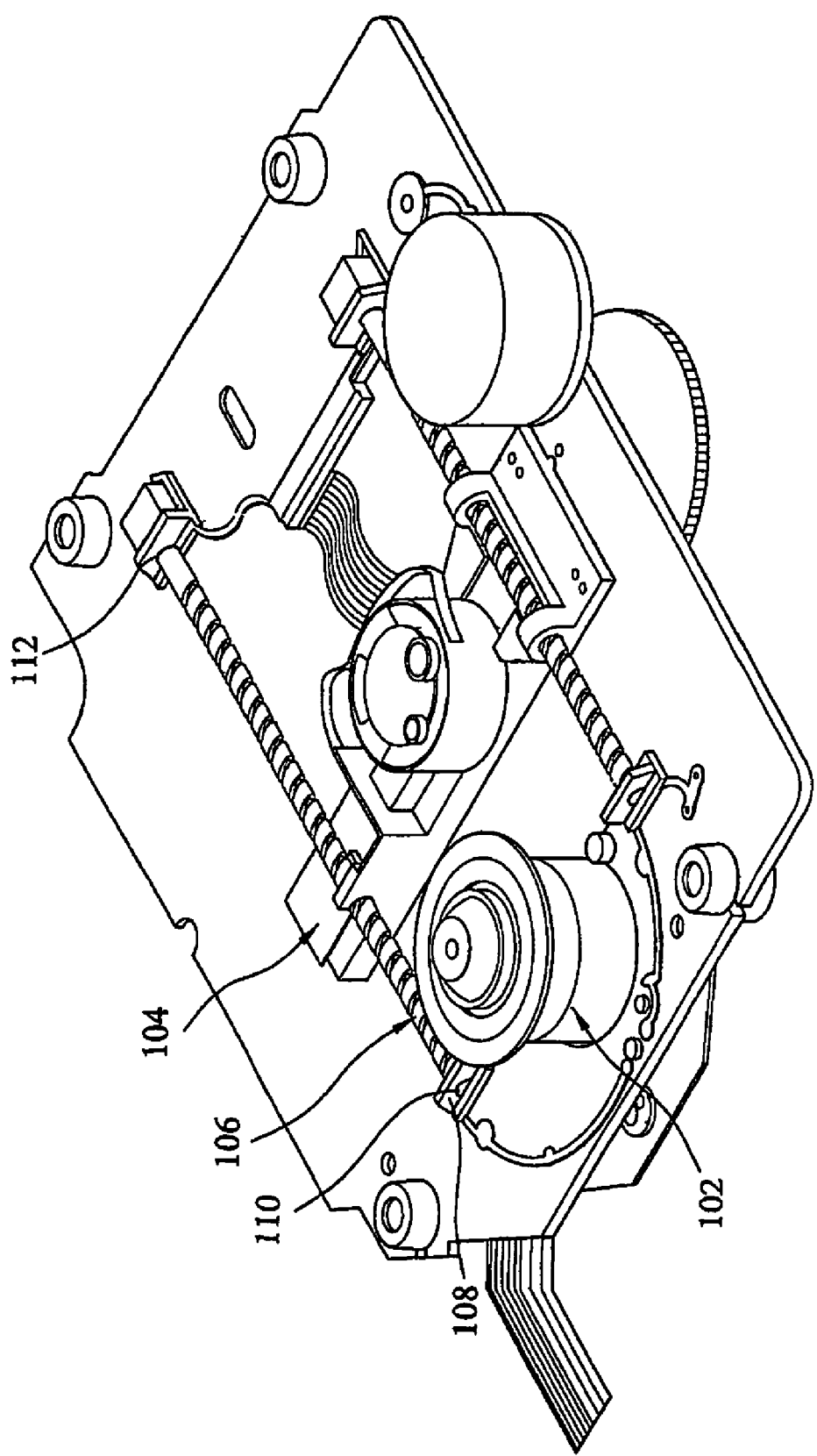
FIG. 1 is a perspective diagram of an internal portion of a conventional optical drive.
Figure 2:
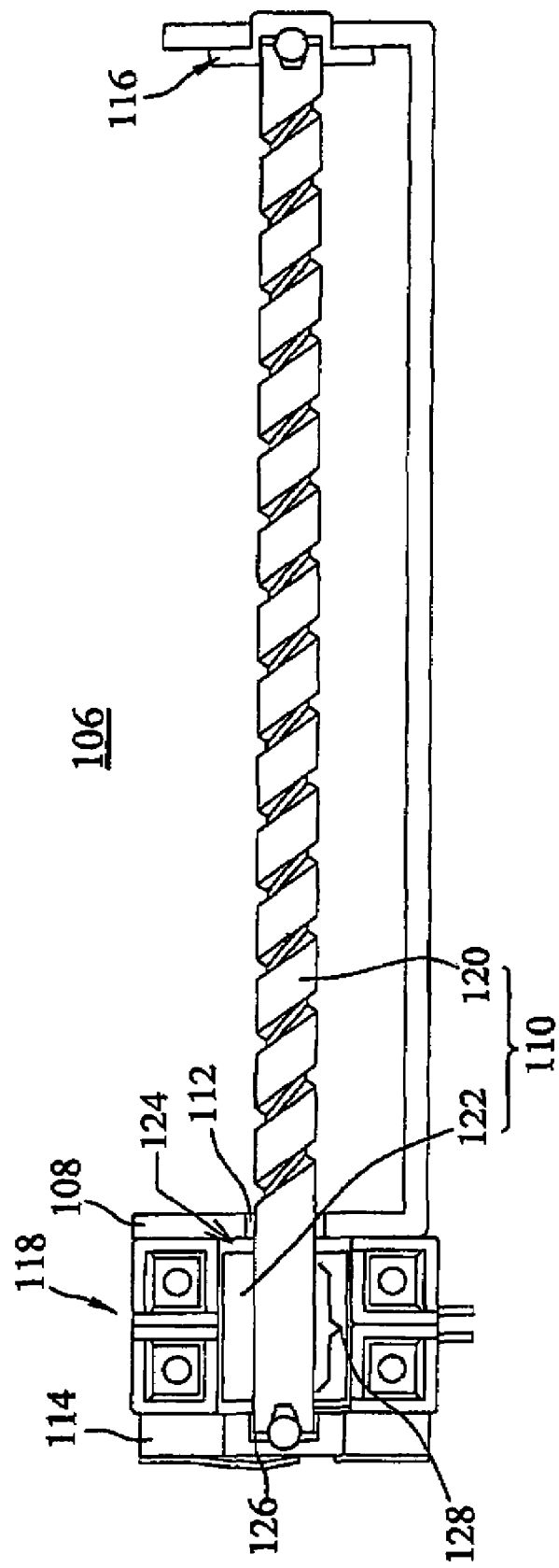
FIG. 2 is a cross section of a conventional guide mechanism.

A pair of openings 214 and 216 is defined on both ends of the guiding base 202. In a varied embodiment, the guide mechanism 200 may comprise two guiding bases, as shown in FIG. 1, and each guiding base 202 respectively has openings 214 and 216 facing each other for mounting the rotary structure 208 therein.

Figure 8:
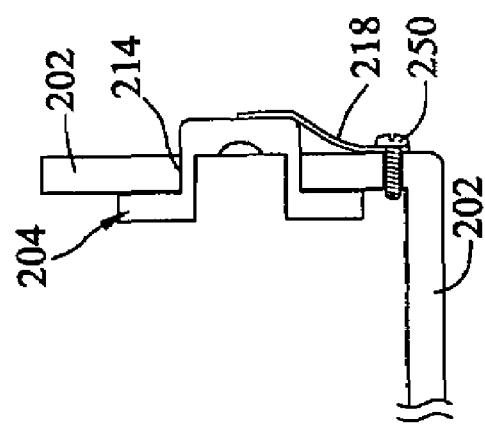
FIGS. 6-8 are cross sections of an elastic element according to the present invention.
Figure 7:
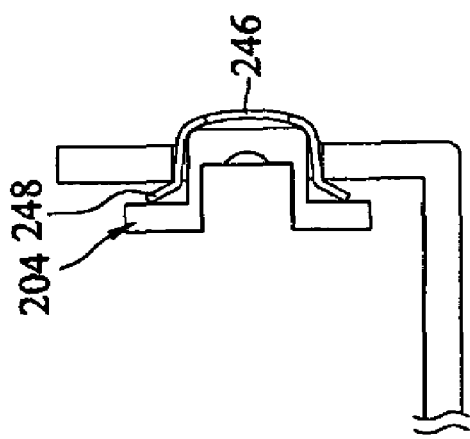
Figure 6:
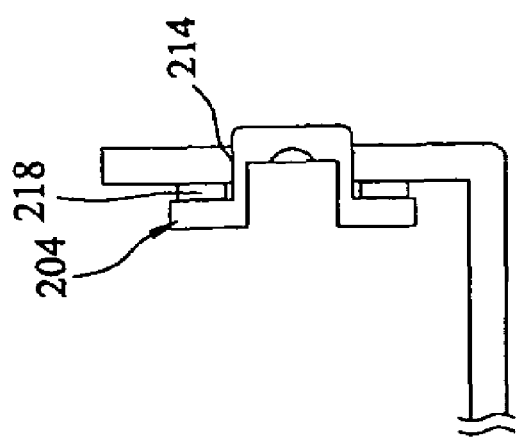

The elastic element 218 has an aperture (not shown) corresponding to the opening 214. The elastic element 218 is arranged on the guiding base 202. The elastic element 218 is a resilient sheet, a spring, or a soft pad. The shape of the he elastic element 218 can be similar to a resilient sheet, a ring, or an arc. As shown in FIG. 6, the elastic element 218 is a soft pad. In FIG. 7, the elastic element 218 comprises a spring clip 246 and a pair of pressing portions 248, respectively located at two ends of the spring clip 246. As shown in FIG. 8, when the elastic element 218 is a resilient sheet, one end of the elastic element 218 can be disposed corresponding to the opening 214 and fixed to the guiding base 202 by a fixing element 250.

The axial fixing member 204 passes through the aperture of the elastic element 218 into the opening 214 and presses the elastic element 218 such that recovery force exerted by the elastic element 218 acts on the axial fixing member 204. The axial fixing member 204 comprises plastic, elastic material, or metal.

The driver 206 can be a rotational motor, disposed on an opposite side of the guiding base 202. The opening 216 is defined on the opposite side of the guiding base 202. The driver 206 drives the rotary structure 208. The driver 206 comprises a housing 220, an opening 222, an electric wire 224, and another axial fixing member 226. The housing 220 serves as a stator of the driver 206, having a case 228 and a cover 230, forming an internal space 232. The case 228 and the cover 230 are assembled to form the housing 220 via a pair of hooks 234. After assembly, the opening 222 corresponding to the opening 216 is defined along an inner edge of the hooks 234. The electric wire 224 surrounds on the ring portion 236 at an end of the axial fixing member 226. The wires 224 and the ring portion 236 of the axial fixing member 226 are disposed in the space 232 (in the driver 206). A retaining portion 238 is disposed at the other end of the axial fixing member. The retaining portion 238 is connected to the ring portion 236 by a rib 240. The retaining portion 238 and the ring portion 236 are integrally and coaxially formed. In addition, the retaining portion 238 corresponds to and faces the opening 216 such that the hook 234 can pass between two ribs 240 of the axial fixing member 226. Thus, the retaining portion 238 of the axial fixing member 226 protrudes from the driver 206 and faces the second opening 216 via the opening 222. The material of the axial fixing member 226 is plastic, elastic material, or metal. In the case when the axial fixing member 226 is not flexible, an elastic element 218 can be attached to the axial fixing member 226.

The rotary structure 208 comprises a magnetic structure 212 and a spindle 210. The magnetic structure 212 is disposed on a connecting portion 242 of the spindle 210. An end of the spindle 210 is shaped corresponding to the axial fixing member 204, and the other end of the spindle has a connecting portion 242, and an operating region 244 is formed between the ends of the spindle. The maximum outer diameter of the connection portion 242 is less than the minimum outer diameter of the operating region 244. A face 252 is present between the connection portion 242 and the operating region 244. In addition, the operating region 244 comprises patterns such as threading formed on a face thereof. The spindle 210 has one end disposed in the axial fixing member 204 and the other end passing through the opening 216 of the guiding base 202 and the opening 222 of the driver 206 and disposed in the retaining portion 238 of the axial fixing member 226. Under the action of the elastic element 218, axial offset of the spindle 210 can be prevented. Thus, the spindle 210 drives the object (not shown) disposed above the operating region 244. The surface of the connecting portion 242 is smooth, rugged and curved, or threaded and curved.

The magnetic structure 212 is disposed on the connecting portion 242. The magnetic structure 212 is rotatable by the magnetic effect produced by the coil 224. The magnetic structure 212 comprises at least a magnet. The shape of the magnetic structure 212 is annular, curved, or block-shaped. In one embodiment, the magnetic structure 212 is shaped as a ring, and the diameter of the central opening along the axial direction of the magnetic structure 212 is slightly greater than the maximum outer diameter of the connecting portion 242, but less than the minimum outer diameter of the operating region 244. The magnetic structure 212 and the spindle 210 are connected by glue.

The annular magnetic structure 212, connected by glue, is given as an example to describe the manufacturing and positioning method of the rotary structure 208. First, glue is applied on the surface of the magnetic structure 212 and the connecting portion 242. Next, the magnetic structure 212 is engaged with the connecting portion 242. Since the face 252 is present between the operating region 244 and the connecting portion 242, when the magnetic structure 212 is mounted on the face 252, automatic positioning is accomplished simultaneously. Finally, after waiting for the glue to dry, the manufacturing process of rotary structure 208 is complete. It should be noted that the glue may be applied on only the connecting portion 242, the inner surface of the magnetic structure 212, or both.

In the process of gluing, if excess glue is used, the face 252 would be larger than the glue thickness. At this point, the face 252 blocks the glue, and thus, effectively prevents overflow.

During operation, the driver 206 drives the rotary structure 208, and the rotary structure 208 further drives the object disposed thereon. The object in the optical drive is a data accessing device 104 (as shown in FIG. 1) for reading data from a disk. The optical drive can be a CD-R/RW, VCD-R/RW, or DVD-R/RW.

In conclusion, the guide mechanism of the present invention has a face between the operating region and connecting portion of the rotary structure in the axial direction. Thus, by installation of the magnetic structure, the guide mechanism can be automatically positioned. An additional positioning jig and labor are eliminated such that material, labor, and manufacturing cost are reduced. Meanwhile, the present invention also prevents glue overflow, and thus, production cost and time can be reduced.

While the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A guide mechanism for guiding an object in a predetermined direction, comprising:
   a guiding base comprising a first opening and a second opening;
   a first axial fixing member disposed at a side of the guiding base;
   a driver disposed at an opposite side of the guiding base, and comprising an opening and a second axial fixing member; and
   a rotary structure disposed between the first axial fixing member and the second axial fixing member, and comprising a spindle and a magnetic structure;
   wherein the spindle comprises an operating region and a connecting portion having a maximum outer diameter smaller than a minimum outer diameter of the operating region, a face is present between the connecting portion and the operating portion, and the magnetic structure is disposed in the opening of the driver and attached to the connecting portion by being disposed to be in direct contact with the face.

2. The guide mechanism as claimed in claim 1, further comprising an elastic element disposed on either the first axial fixing member or the second axial fixing member for preventing offset of the rotary structure.

3. The guide mechanism as claimed in claim 2, wherein the elastic element corresponds to the first opening and is disposed between the first axial fixing member and the side of the guiding base.

4. The guide mechanism as claimed in claim 2, wherein the elastic element has an aperture corresponding to the first opening; and the first axial fixing member passes through the aperture into the first opening.

5. The guide mechanism as claimed in claim 2, wherein the elastic element is a resilient sheet a spring, or a soft pad.

6. The guide mechanism as claimed in claim 2, wherein the elastic element is shaped as a resilient sheet, a ring, or an arc.

7. The guide mechanism as claimed in claim 2, wherein the elastic element comprises a spring clip and a pair of pressing portions respectively disposed at opposite sides of the spring clip.

8. The guide mechanism as claimed in claim 2, further comprising a fixing element, wherein an end of the elastic clement is fixed by the fixing element and the other end of the elastic element is disposed corresponding to the first opening or the second opening.

9. The guide mechanism as claimed in claim 1, wherein the opening corresponds to the second opening.

10. The guide mechanism as claimed in claim 1, wherein the second axial fixing member comprises a ring portion and a retaining portion disposed at each end thereof; the retaining portion is coaxially and integrally formed with the ring portion; the ring portion is disposed in the driver for enclosing electric wires therein, and the retaining portion protrudes from the driver via the opening and faces the second opening.

11. The guide mechanism as claimed in claim 10, wherein the second axial fixing member comprises at least a rib connecting the retaining portion and the ring portion such that the retaining portion protrudes from the driver with respect to the opening.

12. The guide mechanism as claimed in claim 1, wherein the material of the first axial fixing member comprises plastic, elastic material, or metal.

13. The guide mechanism as claimed in claim 1, wherein the material of the second axial fixing member comprises plastic, elastic material, or metal.

14. The guide mechanism as claimed in claim 1, wherein the driver is a rotational motor having a housing; the housing has a space containing the second axial fixing member.

15. The guide mechanism as claimed in claim 14, wherein the housing further comprises a case and a cover forming the space within the housing; and the case and the cover respectively comprises at least a hook for assembly, and the opening is defined along an inner edge of the hook after assembly.

16. The guide mechanism as claimed in claim 1, wherein the magnetic structure and the connecting portion are engaged by glue.

17. The guide mechanism as claimed in claim 1, wherein the magnetic structure comprises at least a magnet.

18. The guide mechanism as claimed in claim 1, wherein the magnetic structure is annular, curved, or block-shaped.

19. The guide mechanism as claimed in claim 1, wherein the magnetic structure has a center opening defined along an axial direction with a diameter ranged between the maximum outer diameter of the connecting portion and the minimum outer diameter of the operating region.

20. An optical drive, comprising:
   a data accessing device; and
   a guide mechanism for guiding the data accessing device in a predetermined direction, comprising:
      a guiding base comprising a first opening and a second opening;
      a first axial fixing member disposed at a side of the guiding base;
      a driver disposed at an opposite side of the guiding base, and comprising an opening and a second axial fixing member; and
      a rotary structure disposed between the first axial fixing member and the second axial fixing member, and comprising a spindle and a magnetic structure;
   wherein the spindle comprises an operating region and a connecting portion having a maximum outer diameter smaller than a minimum outer diameter of the operating region, a face is present between the connecting portion and the operating portion, and the magnetic structure is disposed in the opening of the driver and attached to the connecting portion by being disposed to be in direct contact with the face.

* * * * *